United States Patent [19]

Wason

[11] Patent Number: 4,497,918

[45] Date of Patent: Feb. 5, 1985

[54] THIXOTROPIC UNSATURATED POLYESTER COMPOSITIONS AND METHODS

[75] Inventor: Satish K. Wason, Churchville, Md.

[73] Assignee: J. M. Huber Corporation, Borger, Tex.

[21] Appl. No.: 514,848

[22] Filed: Jul. 18, 1983

Related U.S. Application Data

[63] Continuation of Ser. No. 342,668, Jan. 25, 1982, abandoned, which is a continuation-in-part of Ser. No. 212,461, Dec. 3, 1980, abandoned.

[51] Int. Cl.³ .............................................. C08K 7/00
[52] U.S. Cl. .................................. 523/220; 523/207; 523/513; 523/521; 524/492; 524/493
[58] Field of Search ............... 524/492, 493; 523/220, 523/513, 521, 207

[56] References Cited

U.S. PATENT DOCUMENTS

| | | | |
|---|---|---|---|
| 3,402,151 | 9/1968 | Kutch | 260/77.5 |
| 3,419,533 | 12/1968 | Dieterich | 260/77.5 |
| 3,525,689 | 8/1970 | Marotta | 523/521 |
| 3,525,699 | 8/1970 | Marotta | 523/521 |
| 3,607,822 | 9/1971 | Nishino | 260/37 |
| 4,008,294 | 2/1977 | Marans et al. | 260/862 |
| 4,081,496 | 3/1978 | Finlayson | 260/40 R |
| 4,132,806 | 1/1979 | Wason | 424/357 |
| 4,285,846 | 8/1981 | Hardy et al. | 260/42.55 |

OTHER PUBLICATIONS

Modern Plastics Encyclopedia, pp. 61–62, (1976–1977); pp. 65–66, (1977–1978); pp. 56–59, (1978–1979).

Jurgen Hoell, 32nd Annual Technical Conference, 1977, Reinforced Plastics/Composites Institute, The Society of Plastics Industry, Inc., Scetion 17-D, pp. 1–8.

*Primary Examiner*—Jacob Ziegler
*Attorney, Agent, or Firm*—Harold H. Flanders; Robert L. Price

[57] ABSTRACT

Disclosed are thixotropic polyester compositions wherein the thixotropic characteristics are provided by incorporation into the polyester of a member selected from the group consisting of a precipitated silicon dioxide and a mixture of a precipitated silicon dioxide and a fumed silica. The resulting thixotropic polyester compositions are useful in industries where the resin must not drain from a vertical surface before cure, such as in the boat building industry, and in electrical and transportation applications, and particularly in fiberglass reinforced unsaturated polyester resins and gel coats.

16 Claims, 4 Drawing Figures

RHEOLOGY OF FUMED/PRECIPITATED SILICA BLENDS

FIG. 4.

RHEOLOGY AS A FUNCTION OF
SILICA CONCENTRATION

THIXOTROPIC UNSATURATED POLYESTER COMPOSITIONS AND METHODS

CROSS REFERENCE TO RELATED APPLICATION

This is a continuation of application Ser. No. 342,668, filed Jan. 25, 1982, now abandoned, which is in turn a continuation-in-part of application Ser. No. 212, 461, filed Dec. 3, 1980, now abandoned.

FIELD OF THE INVENTION

This invention relates to novel thixotropic unsaturated polyester compositions, and more particularly to thixotropic cross-linkable compositions and uses of such compositions in reinforced resins and gel coats.

BACKGROUND ART

Unsaturated polyester compositions which are condensation polymers based on glycols and dibasic acids are used in a multitude of applications. These unsaturated polyester resins are essentially Newtonian in nature, that is, their viscosity is not shear dependent. In many of the applications of such resins, the resin must not drain from vertical surfaces before cure and must possess other properties of acceptable thixotropic character, which means that the resin should exhibit high apparent viscosity at low shear and much lower viscosity at high shear, and must also not drain from a vertical surface before cure.

Thixotropic polyester resins and gel coats are widely used in the marine industry as fiberglass reinforced plastics, such as in boat building, corrosion-resistant products and electrical and transportation applications. See "Modern Plastics Encyclopedia", 1977–1978, p. 65–66; and 1978–1979, p. 56–59. These are special fields in which thixotropic resins must be used which meet the requirements set forth above for thixotropic character. See Connolly, "Modern Plastics Encyclopedia", 1975–1976, p. 61–62/ Heretofore, fumed silicas have been widely used for this purpose. See the paper entitled "Thixotropic Behavior of Fumed Silicas in Gel Coats", by Jurgen Hoell, 32nd Annual Technical Conference, 1977, Reinforced Plastics/Composite Institute, The Society of Plastics Industry, Inc.; Section 17-D, p. 1–8. It is well-known, however, that the rheological properties of fumed silicas are highly dependent on the extent of shear and the degree of dispersion. Since the functional performance of the fumed silicas is shear-dependent, it is possible to overdisperse or underdisperse the fumed silicas and consequently produce thixotropic laminating resins with batch to batch variations in rheological properties. Other problems which have been encountered from time to time by the polyester industry with fumed silicas involve their settling properties, cobalt promoter adsorption, lack of product uniformity, moisture sensitivity and the lack of long-term viscosity stability.

The prior art is also aware that materials other than fumed silica have been incorporated into unsaturated polyester compositions, although other inorganic materials have been employed as thixotropic agents. For example, in U.S. Pat. No. 4,081,496, organophilic clay gellant compositions have been incorporated into polyester resins to provide a thixotropic product. In addition, in U.S. Pat. No. 4,008,294, ultrafine polypropylene fibers in epoxy resin compositions have been used to cause the resin composition to have thixotropic characteristics.

In U.S. Pat. No. 3,402,151, zeolite molecular sieves were incorporated into polysulfide compositions to increase storage stability of the compositions. Similarly, in U.S. Pat. No. 3,419,533, it is disclosed that fillers and plasticizers such as carbon black, precipitated silicic acid, silicic acid sols, clay and the like may be incorporated into polyurethane plastics as fillers and plasticizers, but without suggestion as to any thixotropic characteristics. On the other hand, in U.S. Pat. No. 3,607,822, colloidal silica was incorporated into polyurethane compositions to provide a thixotropic polyurethane composition.

There is accordingly a need remaining in the art for a product which can provide advantageous thixotropic properties to unsaturated polyester resins. The present invention provides a composition which meets this need.

SUMMARY OF THE INVENTION

It is accordingly one object of the present invention to provide a novel thixotropic unsaturated polyester composition.

It is a further object of the invention to provide thixotropic agents which may be incorporated into unsaturated polyester plastic compositions and into gel coats to provide thixotropic characteristics thereto.

A further object of the invention is to provide a method for the preparation of thixotropic unsaturated polyester compositions, incorporation of the thixotropic agents within the polyesters, and resulting resin and gel coat products.

An even further object of the invention is to provide methods of use of such thixotropic polyesters in construction of molded products wherein the resin must not drain from a vertical surface prior to cure.

Other objects and advantages of the present invention will become apparent as the description thereof proceeds.

In satisfaction of the foregoing objects and advantages there is provided by this invention unsaturated polyester resins which exhibit excellent thixotropic properties and which have dispersed therein a member selected from the group consisting of precipitated silicon dioxide products and a mixture of precipitated silicon dioxide products and fumed silica. Also provided are methods for production of these thixotropic unsaturated polyester resins and methods for use of the thixotropic unsaturated polyester resins in applications wherein the resin must not drain from a vertical surface before cure.

The present invention also provides novel gel coat unsaturated polyester compositions which exhibit excellent thixotropic properties, said compositions comprising unsaturated polyester resins having incorporated therein a thixotropic amount of a member selected from the group consisting of a precipitated silicon dioxide product and a mixture of a precipitated silicon dioxide product and fumed silica. Also provided are methods for production of these thixotropic unsaturated resins, and products produced from the resins.

BRIEF DESCRIPTION OF THE DRAWINGS

Reference is now made to the drawings accompanying the application wherein:

FIG. I is a graph showing the effect of shear on rheology of silicas;

FIG. II is a graph of viscosity stability versus time of silicas, as thixotropic agents in resins;

FIG. III is a graph of the rheology of blends of precipitated silicas and fumed silica; and FIG. IV is a plot of rheology as a function of silica concentration with respect to viscosity.

BEST EMBODIMENT OF THE INVENTION

Figure 1:
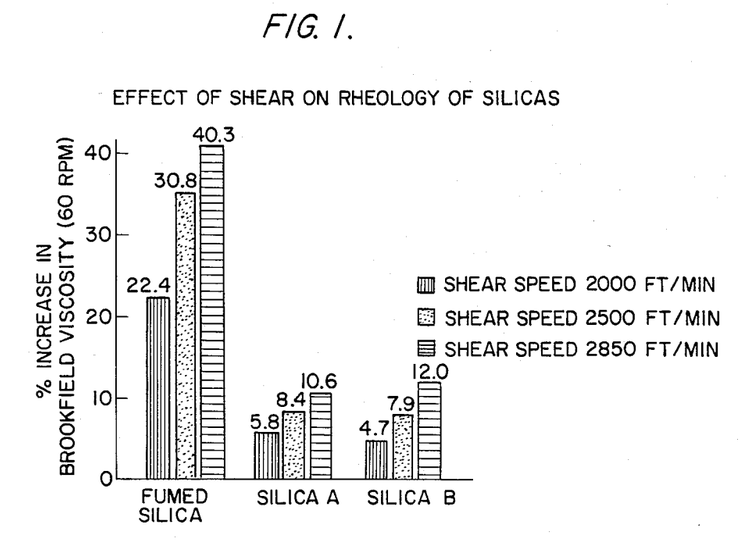
Figure 2:
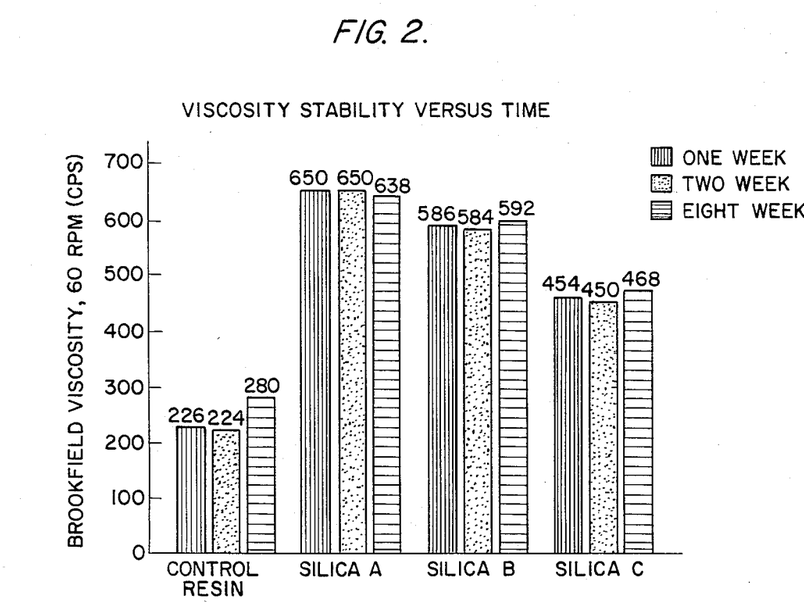
Figure 3:
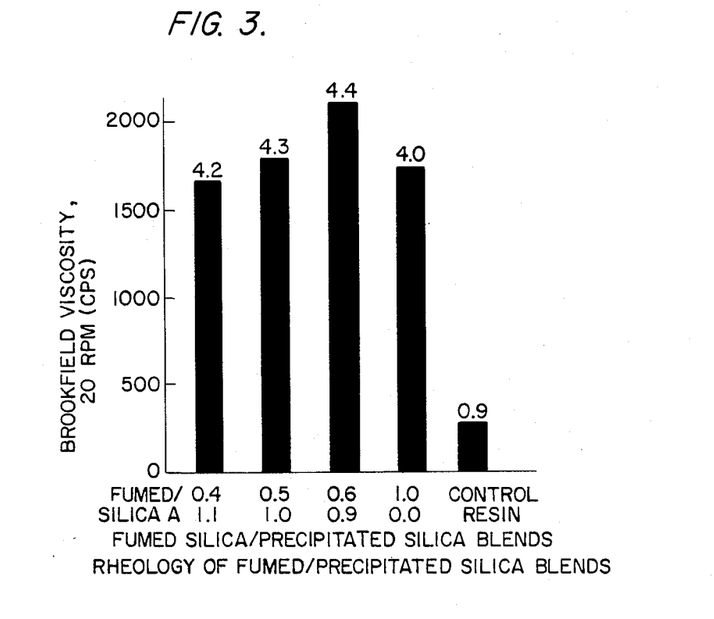
Figure 4:
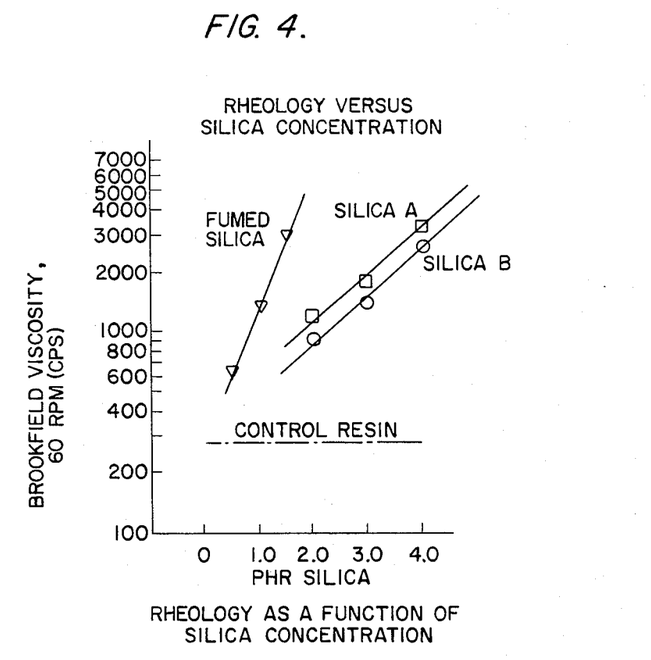

The present invention is concerned with materials which impart thixotropic characteristics to unsaturated polyester resinous materials and the resulting products. The invention is primarily concerned with unsaturated polyester resins which have incorporated therein a thixotropic amount of a precipitated silicon dioxide product or a mixture of a precipitated silicon dioxide product and fumed silica. The resulting polyester resins exhibit thixotropic characteristics that make them suitable in a number of applications, such as in the fiberglass reinforced resin industry, such as boat building, equipment building, sanitary ware corrosion-resistant products, and electrical and transportation applications, and in gel coats on products of this type and others.

According to the present invention, these thixotropic characteristics are imparted by incorporation of a certain precipitated silicon dioxide product or a mixture of precipitated silicon dioxide products and fumed silica. It has also been found that incorporation of small amounts of fumed silica with the precipitated silicon dioxide product synergistic provides thixotropic advantages to unsaturated polyester compositions which are not realized by use of the materials employed in the prior art, such as fumed silica alone. Thus, the unique precipitated silicon dioxide product or mixtures of precipitated silicon dioxide and fumed silica, exhibit improved thixotropic properties over the use of fumed silica alone when incorporated into unsaturated polyesters where the thixotropic nature of the polyester is important. In this specification, the expressions silica and silicon dioxide are used interchangeably meaning the chemical $SiO_2$.

The precipitated silicon dioxide products employed in the present invention are synthetic silicon dioxide materials prepared by the acidulation of an alkali metal silicate such as sodium silicate with an acidification agent such as sulfuric acid under controlled reaction conditions. On the other hand, fumed silicas, which are well-known in the art are prepared by the hydrolysis of silicon tetrachloride vapor in a flame of hydrogen and oxygen at an elevated temperature. Fumed silicas are sold commercially under tradenames such as Cab-o-Sil and Aerosil.

In the prior art, resin manufacturers have experienced diffficulty in the use of fumed silicas because of viscosity drift. Thus, when the fabricator of the product buys a container of resin, on occasion he will find that the resin at the top of the container has a lower viscosity than the resin at the bottom of the container because of settling of the fumed silica thixotrope. Also, it is common to observe a viscosity drift in the thixotropic resin on aging. Moreover, in the construction of fiberglass reinforced plastic products such as boats and the like, it is important that the resin be one which does not drain from a vertical surface before cure. Moreover, moisture sensitivity, shear sensitivity, lack of product uniformity and long-term viscosity stability are important characteristics in a thixotropic resin formulation. These are characteristics which the fumed silica does not satisfy sufficiently, but which are provided by the precipitated silicon dioxide alone and also mixtures of precipitated silicon dioxides and fumed silicas of the present invention. Thus, it will be understood that the precipitated silicon dioxide products and mixtures thereof with fumed silica, particularly when applied with a suitable additive or wetting agent in unsaturated polyester compositions, provides unsaturated polyester compositions with a higher thixotropic index, better viscosity stability and handling properties, as well as increased cost performance characteristics, when compared with the prior art.

In understanding the present invention, it has been discovered that the rheological properties of the fumed silicas used previously in the art are highly dependent on the extent of shear and degree of dispersion. Thus, since the functional performance of the fumed silicas is shear-dependent, it is easy to overdisperse or underdisperse the fumed silicas and consequently produce laminating resins with variations in rheological properties from one batch to another. Other problems encountered from time to time by the polyester industry with fumed silicas concern settling properties, cobalt promoter adsorption, lack of product uniformity, moisture sensitivity and the lack of long-term viscosity stability.

It has been found that the precipitated silicon dioxide products of this invention overcome these disadvantages, particularly because they are characterized by controlled structure, controlled particle size, and controlled surface area. These characteristics are advantageous since the surface properties of the silicas are related to the silanol group density and extent of hydration, and since the precipitated silicon dioxide products are prepared in an aqueous medium, their surface is fully hydroxylated. Thus, the surfaces of the precipitated silicon dioxide are unique in that they are more polar than the fumed silicas, and since the unsaturated polyester resin is chemically a medium polar system, it is more compatible with the polar surface of the precipitated silicon dioxide than with the relatively less polar surface of the fumed silicas. Further, because the precipitated silicon dioxide products are prepared in a water or high polar medium, their rheological properties are less prone to moisture sensitivity than the fumed silicas. Further, the precipitated silicon dioxide thixotropic agents of the present invention are controlled structure precipitated silicon dioxides whose functional performance can be varied by controlling the structure and particle size. Moreover, the product quality and uniformity of the silicon dioxides are assured through the uniformity of the manufacturing process.

The precipitated silicon dioxide products employed in the present invention may be characterized as having a surface area in the range of about 60–300 $m^2/g$, a bulk density of about 64–96 g/l, a 5% pH in the range of about 6.5 to 7.5, as containing 8–10 silanol groups per $nm^2$, and as having an average primary or ultimate particle diameter of about 18 nm. Moreover, the oil absorption of the silicon dioxide products range from about 175 to 250 ml/100 g, with an average aggregate or secondary particle size ranging from about 1–10 micrometers. The preferred silicon dioxide products are those which exhibit very high wet cake moistures (WCM), although medium wet cake moisture products can also be used.

As pointed out above, the precipitated silicon dioxide products of this invention are produced by the reaction of an alkali metal silicate such as sodium silicate with an acidification agent such as sulfuric acid in accordance with the following equation:

$$Na_2OxSiO_2 + H_2SO_4 \rightarrow xSiO_2 + Na_2SO_4 + H_2O$$

wherein x represents the molar ratio or the amount of silicon dioxide which is combined with Na$_2$O in the production of the sodium silicate solutions.

These materials are well-known in the art and are produced as described in U.S. Pat. Nos. 3,967,563, 4,132,806, 4,202,813, and copending application Ser. No. 039, 061, filed May 11, 1979, now U.S. Pat. No. 4,336,245. They are sold commercially by the J. M. Huber Corporation under the trademark Zeothix.

If the precipitated silicon dioxide is blended with a fumed silica, the fumed silica which is available commercially under the tradenames such as Aerosil and Cab-O-Sil, will normally have a surface area in the range of 200–400 m$^2$g, have a non-porous external surface, have a bulk density in the range of 32–64 g/l, a 5% pH value of 3.0–4.2, with 2–4 silanol groups per nm$^2$ and an average primary or ultimate particle diameter of 14 nm.

In use as a thixotropic agent, the precipitated silicon dioxide or mixture with fumed silica, is incorporated into an unsaturated polyester resin. In the prior art, the amount of fumed silica normally used is less than the amount of precipitated silicon dioxide required. However, the advantages of the silicon dioxides are such that one can use more of a lower cost material with improved thixotropic characteristics so as to make the precipitated silicon dioxide suitable for replacement of the fumed silica. The amount of precipitated silicon dioxide normally employed is about 2.5 times per part of fumed silica to achieve the same rheological properties.

The amount of precipitated silicon dioxide to be incorporated into the unsaturated resin ranges from about 1 to 5 phr (parts per hundred parts of resin), preferably about 2 to 4 phr. When the precipitated silicon dioxide is used in admixture with fumed silica, the fumed silica may be present in the range of up to 60 wt%. These blends are incorporated into the resin in the range of 0.5 to 5 phr, preferably about 0.75 to 4 phr. Use of the mixtures or blends of precipitated silicon dioxide and fumed silica have been found to provide advantageous properties as a synergistic effect has been observed in the rheology, especially in improved viscosity, as shown by FIG. III.

In a further embodiment of the present invention, additives which appear to act as wetting agents may be included in the composition. These additives have been found to improve the rheology of the silicon dioxide products when incorporated into the polyester resins. These materials are included in amounts up to 25 weight percent based, preferably 5 to 20 wt%, based on the weight of the silicon dioxide employed in the composition. This additive or wetting agent is preferably a glycerine material such as glycerine or other polyfunctional alcohols including ethylene glycol, or a sorbitan monolaureate polyoxyalkylene, sold commercially under the tradename "Tween". Preferred additives are ethylene glycol, glycerine or a polyoxyethylene sorbitan monolaureate, sold commercially as Tween 20.

The polyester resins into which the thixotropic agents are incorporated are unsaturated polyester compositions well-known in the art which comprise polyesters based on unsaturated dibasic acids or acid anhydrides and diols, usually in admixture with unsaturated aromatic monomers as described, for example, in U.S. Pat. No. 4,081,496. These polyesters are used in preparation of glass fiber-reinforced laminates wherein the thixotropic gelling agents are employed which decrease the viscosity of the uncross-linked polyester at high shear such as is developed in mixing and spraying but which increase their viscosity at low or no shear to prevent drainage of the composition along the vertical surfaces to which they are applied.

The unsaturated polyesters useful in preparing the thixotropic compositions of this invention are polyesters of a dicarboxylic acid and a diol having a major amount of olefinic unsaturation, preferably 10 to 75 olefin groups per 100 ester groups. The olefinic unsaturation is preferably derived from the carboxylic acid although the diol may also be unsaturated. Typical diols are ethylene glycol and propylene glycol. Typical unsaturated acids include maleic acid, fumaric acid and phthalic acid. Isophthalic acids are commonly employed in gel coat compositions. Anhydrides of these acids are also commonly used. Such polyesters are made by conventional techniques of esterification as well-known in the art. Generally, polyesters having molecular weights of from about 400 to 10,000 and acid numbers in the range of from 35 to 45 mg KOH per gram of resin are useful for preparing thixotropic compositions of this invention.

The amounts of unsaturated polyester in the final polyester composition can range from at least 40% and preferably from about 50% to 95% by weight with the remainder being unsaturated aromatic monomer.

The unsaturated aromatic monomers of this invention are aromatic compounds to which is bonded one or more ethylenically unsaturated radicals such as a vinyl radical, substituted vinyl radical or an allylic radical. Suitable monomers include styrene, α-methyl styrene, divinyl benzene and allyl benzene. Styrene is preferred due to its effectiveness, wide use and availability. Such monomers are used in cross-linking the polyesters and also act as diluents to reduce viscosity.

Maleic anhydride is the unsaturated dibasic acid most commonly used. The common glycols are propylene, dipropylene, ethylene, diethylene, and neopentyl used singly, or in combination. Frequently, saturated acids such as phthalic anhydride, isophthalic acid, or adipic acid are used with the unsaturated acids to control the degree of unsaturation. This in turn controls the degree of chemical reactivity in cross-linking and the physical properties of the cured resin.

Styrene is the cross-linking monomer usually used. Methyl methacrylate, diallyl phthalate, and vinyl toluene are monomers sometimes employed when their special properties are desired.

A strong, three-dimensional polymer is produced when the polyester and monomer are chemically bonded together. This cross-linking is achieved by the addition and activation of a catalyst, usually an organic peroxide. Completion of this curing reaction is dependent on both the polymer formulation and the time/temperature sensitivity of the catalyst system selected.

While catalysts may be activated by heat alone, some of the resin systems and fabrication processes involve curing at ambient temperatures. This is brought about by the addition of cobalt soaps and/or tertinary amines. These accelerators cause peroxide decomposition, resulting in rapid gel and cure in an exothermic reaction. Uninhibited resin-styrene slutions are relatively unstable and have poor shelf-life. Premature gelation may be caused by heat or ultraviolet radiation. Small amounts of antioxidant-type inhibitors are added during manufacture to ensure adequate shelf life. Additional inhibitors may be added to control cure cycles during cross-linking.

Unsaturated polyesters are one of the most versatile, economical, and widely used members of the thermosetting resin family. Polyester resin systems are suitable for virtually every process employed with thermosetting resins. Different formulations are made to provide specific processing and durability characteristics.

Resin manufacturers modify the basic resin to satisfy the needs. For example, increased hot strength can be obtained by increasing the amount of unsaturated dibasic acid in the formulation. This allows moldings to be more easily removed from the hot mold or die without loss of dimensional stability or shape. Exothermic heat can be controlled to desired levels by careful balancing of the ratio of unsaturated to saturated acids in the resin.

There are many additives and reinforcements used with unsaturated polyesters. The most widely used reinforcements are glass fibers which impart dramatic improvements in physical and structural properties. Several different basic forms of glass fiber are available which allow flexibility in cost, strength and process selection.

Inorganic fillers such as clay, ground limestone, alumina hydrate, and other additives give the end product specific properties or characteristics. Pigments are added for color.

The resulting thixotropic polyester resins of this invention exhibit the following advantages over thixotropic polyesters using fumed silicas of the prior art:

Because of their fully hydroxylated polar surface, the thixotropic properties of the polyesters are less sensitive to moisture than those with fumed silicas; are significantly less shear dependent than when compared with fumed silicas, and therefore, cannot be over- and under-dispersed in the laminating resin; exhibit stable viscosity over an extended period of time; the silicon dioxides are less dusty; and are easier to incorporate and disperse into the laminating resin so that less energy input is required to properly disperse the precipitated silicas. Also, the precipitated silicas exhibit better sag resistance and acceptable anti-settling properties at lower raw materials cost.

An especially important embodiment of the present invention concerns gel coats formed from the thixotropic polyesters of the invention. Gel coats are specially formulated polyester resins with a thixotrope, fillers and pigment to impart the desired flow and color properties. Fumed silica is now commonly applied as a thixotrope which provides the required film thickness, determines the viscosity and improves nonsag, as well as pumping characteristics.

A gel coat is a polyester coating which is applied to the mold surface and becomes an integral part of the finished product. Its function is to protect the fiberglass or other surface from the environment and provide a smooth, colorful, corrosion-resistant surface which is pleasing to the eye and provides a good cosmetic appearance.

A commercial gel coat composition consists of an unsaturated polyester resin, styrene as a cross-linking monomer, a promoter such as cobalt octoate or naphthenate, a thixotrope such as fumed silica, a filler such as calcined clay, alumina or talc and a pigment such as titanium dioxide or other colored pigment. The function of the thixotrope is to increase the viscosity of the gel coat and to provide a composition which would not sag or drain from vertical surfaces. The function of the filler is to provide proper flow properties and to reduce cost of gel coat. The function of the pigment is to provide the necessary color to the gel coat. Fumed silica is widely used as a thixotropic agent in the gel coat compositions.

It has been found according to the present invention that the precipitated silicon dioxide products used alone or in admixture with fumed silicas, are also excellent thixotropic agents in unsaturated polyester resins used as gel coats. The silicon dioxide products, used alone or in admixture with fumed silicas, are used in gel coats in the same amounts and manner as in the reinforced unsaturated polyester resins.

As pointed out above, the thixotropic agents and resulting unsaturated polyester resins are useful in a wide variety of areas. Thus the thixotropic reinforced unsaturated polyester resins and gel coats may be employed in trays, boats, tanks, bathroom seating, tub/-showers, sanitary ware, housings, machine covers and guards, safety helmets, electronic parts, sealants, encapsulations, gel coats, patching compounds, bowling balls, structural panels, glazing, skylighting, corrosion resistant applications such as pipes, tanks, ducts, fume stacks, building panels, Coast Guard ships, electrical parts, ducts, aircraft and electronic components and other parts subject to high temperatures, automotive and appliance appearance parts, and the like.

The following examples are presented to illustrate the invention but it is not to be considered as limited thereto. In these examples and throughout the specification, parts are by weight unless otherwise indicated.

EXAMPLE 1

In the following examples, the thixotropic properties of polyesters containing the precipitated silicon dioxide product are compared with respect to rheology, sag resistance, shear, and viscosity, using different concentrations, with respect to a control resin without silica, and a resin to which fumed silica has been added. Further, a wetting agent additive is also incorporated into the compositions for evaluation.

The unsaturated polyester resins of the orthophthalic type were obtained from suppliers such as Cargill, Synres, Lancaster Chemical, Advanced Coatings, and Reichhold. These resins were diluted with styrene monomer to a total styrene level of 45% by weight. The viscosity of the diluted resin generally fell between $250\pm50$ cps at 25° C. when determined by the SPI method.

Cobalt Octoate (12%) promoter at 0.3 phr (parts per hundred resin) was added to the diluted resin to approximately match the industrial composition of a typical laminating resin.

Synthetic precipitated silicon dioxide samples A, B and C with controlled structure, particle size and surface area were as described in the following tables. The fumed silica used as a reference standard in this study was Cab-O-Sil M-5, manufactured by the Cabot Corporation.

In all cases except otherwise specified, 400 gram batches of the promoted diluted resin were mixed with known levels of synthetic silicon dioxide as rheological control agent. The dispersion of the synthetic silicon dioxide in the resin was accomplished in a Cowles Dissolver (equipped with 2 inch diameter blade) by first mixing the synthetic silicon dioxide for one minute at a tip speed of 980 ft/min and then for five minutes at a tip speed of 2500 ft/min. Proper precautions were taken not to let the temperature of the resin/silicon dioxide dispersion go above 95° F. (35° C.) while mixing on the Cowles Dissolver. The dispersions were then equilibrated in a thermostatically controlled water bath set at 25° C.

Additives were added to the dispersion when necessary during the five minute mix cycle on the Cowles Dissolver. The additive percent was always based on the weight of silicon dioxide.

Rheological properties of the synthetic silicon dioxide dispersions in the unsaturated polyester resins were determined by the SPI method. Brookfield Viscometer, model LVT was used for all evaluations except in some cases Model RVF was also used. Thixotropic Index (T.I.) was determined by taking the ratio of 6/60 rpm viscosities or 2/20 rpm viscosities.

Settling properties were evaluated by pouring a portion of the synthetic silicon dioxide laminating resin dispersion in a glass jar and then evaluating the settling as a function of time.

The drain properties or the sag resistance properties were evaluated by the glass plate method. In this method, a known weight of fumed silica thixed resin was allowed to drain from a vertical glass plate for a distance of 6 inches. The time taken by a fumed silica thixed resin was compared with the time taken by the precipitated silicon dioxide thixed resin. The ratio of the times was used to compare the sag resistance efficiency of one silica to the other silica. In those cases where the sag properties of silicas were drastically different, a more stringent test method was utilized.

In the more stringent method, a known weight of a 2 ounce glass mat was put on an aluminum foil. The thixed laminating resin was poured onto the glass mat making sure that the ratio of polyester resin to the glass was 70/30. The resin was worked into the glass mat for 15 seconds. The aluminum foil with the resin saturated glass mat was hung in a vertical position. The drain properties of a precipitated silicon dioxide were compared with fumed silica by measuring the extent of drainage.

The following Table 1 sets forth the characteristics of the precipitated silicon dioxide products used as Samples A, B, and C used in these examples:

TABLE 1

| PROPERTIES | SILICON DIOXIDE | | |
|---|---|---|---|
| | A | B | C |
| 5% pH | 6.9 | 7.1 | 7.1 |
| Oil Absorption, ml/100 g | 218 | 197 | 195 |
| BET Surface Area, m²g | 204 | 137 | 133 |
| Ave. Particle Size, μm | 1.8 | 2.5 | 3.4 |
| Bulk Density, g/l | 75 | 79 | 89 |

Effect of Shear

The effect of shear on the thixotropic properties of fumed silica and precipitated silicon dioxide sampels A and B was evaluated in Synres laminating resin P 2020. Data in FIG. I depicts the % viscosity increase at tip speed of 2000 ft/min, 2500 ft/min and 2850 ft/min respectively, when compared with the viscosity of thixed resin at tip speed of 1500 ft/min. This study shows that the viscosity building properties of fumed silicas are more sensitive to shear than precipitated silicon dioxide thioxotrope.

Viscosity Stability

Thixotropic properties of precipitated silicon dioxide products were evaluated in an unpromoted diluted Reichhold resin. The viscosity stability was studied for eight weeks. The data in FIG. II shows that precipitated silicon dioxides exhibit excellent viscosity stability properties as a function of time. The numbers on the graph represent actual viscosity values. As expected the higher structure silica A performed better than the relatively lower structure silica C. The viscosity building properties of silica B fell between those of silicas A and C.

The settling properties of polyester laminating resins thixed with precipitated silicas were also compared with resins containing fumed silicas. The settling behavior was evaluated up to 12 weeks. The resins thixed with precipitated silicas were found to be generally better in anti-settling properties than resins thixed with fumed silicas. It appears that the polar surface of precipitated silica is more compatible with the chemically polar polyester resin than with the less polar surface of the fumed silica. This explains the better anti-settling properties of precipitated silica/polyester resin dispersions.

Evaluation of Sag Resistance

The sag resistance properties of fumed and precipitated silicas were studied in the Reichhold resin by the glass plate method (see experimental section). The % Sag Rating was calculated by the following equation:

$$\% \text{ Sag Rating} = \frac{T_p - T_f}{T_f} \times 100$$

where:

$T_p$ = time taken by the precipitated silica thixed resin.
$T_f$ = time taken by the fumed silica thixed resin.

The sag resistance ratings of fumed and precipitated silicas are listed in Table 2. It is clear that at 3 phr level, the sag resistance properties of precipitated silicas A and B are significantly better than fumed silica.

TABLE 2

| SAG RESISTANCE EVALUATION | | | | |
|---|---|---|---|---|
| Product | PHR Silica | % Additive[a] | Brookfield Viscosity[b] | | Sag Rating |
| | | | 60 rpm | T.I. | |
| Fumed | 1 | 5 | 738 | 1.4 | Std. |
| Fumed | 1 | 10 | 790 | 1.9 | +37% |
| Silica A | 3 | 5 | 968 | 2.6 | +110% |
| Silica A | 3 | 10 | 1110 | 2.6 | +255% |
| Silica B | 3 | 5 | 764 | 1.8 | +6% |
| Silica B | 3 | 10 | 892 | 2.1 | +64% |
| Control Resin[c] | — | — | 296 | — | — |

[a]Glycerine additive % based on the weight of silica
[b]One week viscosity
[c]Reichhold resin

EXAMPLE 2

Evaluation of Blends with Fumed Silica

The thixotropic properties of fumed silica and hydrated silicon dioxide blends were evaluated in the Lancaster Chemical laminating resin. This general purpose resin was promoted with cobalt octoate and then diluted to 55% solids with styrene monomer. The rheological properties of fumed silica/hydrated silica A blends in the ratio of 0.4/1.1, 0.5/1.0 and 0.6/0.9 phr were evaluated. Data are listed in FIG. III. The numbers on the top of the graph represent thixotropic index (T.I.) values. From this data it will be observed that the blends are significantly improved as compared to the control resin and that the blends are better than fumed silica alone.

The following Table 3 sets forth the experimental data for this evaluation. The precipitated silica used was Zeothix 265 (Silica A described in Example 1), and the fumed silica was Cab-O-Sil, sold under that name by Cabot Corporation. The resin was the Lancaster resin described above diluted to 60% solids with styrene. The resin was prepared as a 600 gram master batch with 0.3% cobalt, 18.0 grams of 12% cobalt being added to the diluted resin.

The disperser used was a 5000 RPM Cowles Dissolver and the viscometer was a Brookfield Viscometer Model RVF Spindle No. 3. The data was as follows:

TABLE 3

| | Run Numbers | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Lancaster Resin Diluted Wt. | 400.0 | 400.0 | 400.0 | 400.0 | 400.0 | 400.0 | 400.0 | 400.0 | 400.0 | 400.0 | 400.0 | 400.0 | 400.0 |
| Cab-O-Sil m.5 | | 4.0 | 1.6 | 2.0 | 2.4 | 4.0 | 1.6 | 2.0 | 2.4 | 4.0 | 1.6 | 2.0 | 2.4 |
| Zeothix 265 | | | 4.4 | 4.0 | 3.6 | | 4.4 | 4.0 | 3.6 | | 4.4 | 4.0 | 3.6 |
| Cobalt octate (12%) | 1.2 | 1.2 | 1.2 | 1.2 | 1.2 | 1.2 | 1.2 | 1.2 | 1.2 | 1.2 | 1.2 | 1.2 | 1.2 |
| Glycerine 99.5% | | 0.2 | 0.3 | 0.3 | 0.4 | 0.6 | 0.6 | 0.6 | 0.8 | 1.2 | 1.2 | 1.2 | 1.2 |
| 2 RPM Dial reading (24 hrs) | 0.5 | 11.5 | 8.0 | 8.75 | 10.5 | 13.0 | 8.25 | 9.0 | 12.75 | 14.25 | 14.0 | 15.0 | 18.75 |
| 20 RPM Dial reading (24 hrs) | 5.75 | 30.5 | 24.5 | 25.5 | 28.0 | 32.25 | 25.75 | 26.75 | 32.5 | 35.0 | 33.5 | 36.0 | 42.25 |
| 2 RPM Viscosity (24 hrs) | 250 | 5750 | 4000 | 4375 | 5250 | 6500 | 4125 | 4500 | 6325 | 7125 | 7000 | 7750 | 9375 |
| 20 RPM Viscosity (24 hrs) | 286 | 1525 | 1225 | 1275 | 1400 | 1613 | 1288 | 1338 | 1625 | 1750 | 1675 | 1800 | 2113 |
| Thix Index (24 hrs) | 0.87 | 3.77 | 3.27 | 3.37 | 3.75 | 4.03 | 3.20 | 3.36 | 3.92 | 4.07 | 4.18 | 4.31 | 4.44 |
| 2 RPM Dial reading (1 wk) | 0.5 | 10.0 | 7.25 | 8.00 | 9.0 | 12.75 | 8.25 | 8.50 | 11.0 | 13.25 | 11.0 | 11.25 | 14.00 |
| 20 RPM Dial reading (1 wk) | 6.5 | 33.0 | 27.5 | 28.25 | 29.75 | 38.25 | 28.0 | 29.0 | 30.0 | 38.00 | 30.75 | 33.0 | 36.5 |
| 2 RPM Viscosity (1 wk) | 250 | 5000 | 3825 | 4000 | 4500 | 6325 | 4125 | 4250 | 5500 | 6875 | 5500 | 5625 | 7000 |
| 20 RPM Viscosity (1 wk) | 325 | 1650 | 1375 | 1438 | 1450 | 1913 | 1400 | 1450 | 1500 | 1900 | 1538 | 1650 | 1825 |
| Thix Index (1 wk) | 0.77 | 3.03 | 2.82 | 2.73 | 3.10 | 3.33 | 2.95 | 2.93 | 3.67 | 3.62 | 3.58 | 3.41 | 3.84 |
| 2 RPM Dial reading (2 wks) | 0.5 | 11.5 | 7.25 | 8.25 | 9.75 | 10.5 | 8.25 | 8.50 | 11.5 | 10.5 | 13.25 | 13.5 | 13.75 |
| 20 RPM Dial reading (2 wks) | 5.5 | 31.75 | 19.25 | 25.5 | 29.0 | 34.0 | 25.5 | 25.75 | 32.25 | 32.0 | 39.25 | 36.0 | 37.75 |
| 2 RPM Viscosity (2 wks) | 250 | 5750 | 3605 | 4125 | 4875 | 5250 | 4125 | 4250 | 5750 | 5250 | 6625 | 6750 | 6875 |
| 20 RPM Viscosity (2 wks) | 275 | 1888 | 963 | 1275 | 1400 | 1700 | 1275 | 1288 | 1638 | 1600 | 19.75 | 1800 | 1888 |
| Thix Index (2 wks) | 0.91 | 3.62 | 3.76 | 3.24 | 3.36 | 3.09 | 3.24 | 3.30 | 3.51 | 3.28 | 3.35 | 3.75 | 3.64 |
| 2 RPM Dial reading (4 wks) | 0.75 | 10.5 | 7.0 | 7.5 | 8.5 | 11.25 | 8.0 | 9.0 | 11.0 | 13.5 | 10.5 | 11.5 | 14.5 |
| 20 RPM Dial reading (4 wks) | 7.5 | 30.0 | 23.25 | 24.5 | 27.5 | 30.5 | 24.5 | 25.5 | 29.5 | 35.25 | 30.0 | 32.0 | 38.0 |
| 2 RPM Viscosity (4 wks) | 375 | 5250 | 3500 | 3750 | 4250 | 5625 | 4000 | 4500 | 5500 | 6750 | 5250 | 5750 | 7250 |
| 20 RPM Viscosity (4 wks) | 375 | 1500 | 1163 | 1225 | 1375 | 1525 | 1225 | 1275 | 1475 | 1763 | 1500 | 1600 | 1900 |
| Thix Index (4 wks) | 1.0 | 3.50 | 3.01 | 3.06 | 3.09 | 3.69 | 3.27 | 3.53 | 3.72 | 3.83 | 3.50 | 3.59 | 3.82 |

EXAMPLE 3

A. The following example studies the effect of glycerine as an additive on the rheology of synthetic silicon dioxides in the Advanced Coatings laminated resin. The resin was diluted to 55% solids with styrene monomer and the effect of silica concentration and glycerine additive on rheology was studied with various synthetic silicas. Data are listed in Table 3 and plotted in FIG. IV. Examination of data in FIG. IV reveals that precipitated silica A performed better than silica B in rheological properties. From the graph (FIG. IV), it is clear that to produce a thixed resin with a Brookfield viscosity (60 rpm) of 1000 cps, one needs to add 0.8 phr fumed silica or 1.8 phr of silica A to the Advanced Coatings diluted resin.

TABLE 4

EFFECT OF GLYCERINE AND SILICA CONCENTRATION ON RHEOLOGY

| Product | PHR Silica | % Additive[a] | Brookfield Viscosity[b] 6 rpm | 60 rpm | T.I. |
|---|---|---|---|---|---|
| Fumed Silica | 0.5 | 20 | 1000 | 660 | 1.5 |
| | 1.0 | 20 | 3940 | 1346 | 2.9 |
| | 1.5 | 20 | 12,200 | 3200 | 3.8 |

TABLE 4-continued

EFFECT OF GLYCERINE AND SILICA CONCENTRATION ON RHEOLOGY

| Product | PHR Silica | % Additive[a] | Brookfield Viscosity[b] 6 rpm | 60 rpm | T.I. |
|---|---|---|---|---|---|
| Silica A | 2.0 | 20 | 3080 | 1150 | 2.7 |
| | 3.0 | 20 | 6680 | 1854 | 3.6 |
| | 4.0 | 20 | 14,600 | 3400 | 4.3 |
| Silica B | 2.0 | 20 | 2000 | 882 | 2.3 |
| | 3.0 | 20 | 4320 | 1434 | 3.0 |
| | 4.0 | 20 | 9200 | 2600 | 3.5 |
| Control Resin[c] | — | — | 340 | 268 | 1.3 |

[a]Additive % based on the weight of silica
[b]One day viscosity
[c]Advanced coatings resin B. Another study was undertaken in which the effects of silica concentration and additive level were further explored. The additive level range included 0, 5, 10 and 20% additive based on the weight of silica. Precipitated silica samples A, B and C were evaluated at 2, 3 and 4 phr levels. The fumed silica was dispersed into the diluted resin at 0.5, 1.0 and 1.5 phr, respectively. The Brookfield viscosity data (60 rpm) was analyzed by a linear regression program and fitted to the equation, $Y = a + bX1 = cX2$, where Y is the Brookfield viscosity at 60 rpm, X1 is the phr level of synthetic silica and X2 is the percent additive level based on the weight of silica. The regression equation and correlation coefficients expressing the rheology performance of synthetic silica as a function of silica concentration and additive level are listed in Table 5.

TABLE 5

MATHEMATICAL CORRELATION BETWEEN VISCOSITY, SILICA CONCENTRATION AND GLYCERINE ADDITIVE

| Product | Regression Equation | Correlation Coefficient |
|---|---|---|
| Fumed Silica | $Y = -897 + 1830.7X1 + 41.4X2$ | 0.93 |
| Silica A | $Y = -1443 + 863.3X1 + 51.4X2$ | 0.95 |

TABLE 5-continued
MATHEMATICAL CORRELATION BETWEEN VISCOSITY, SILICA CONCENTRATION AND GLYCERINE ADDITIVE

| Product | Regression Equation | Correlation Coefficient |
|---|---|---|
| Silica B | Y = −691 + 550.7X1 + 31.2X2 | 0.95 |

Where Y = Brookfield Viscosity, 60 rpm
X1 = PHR Silica Concentration
X2 = % Additive Level Based on the Weight of Silica

EXAMPLE 4

Effect of Additives

Additives such as Tween 20 ®, (polyoxyethylene sorbitan monolaurate), can be used to improve the rheological properties of precipitated silica. The purpose of this experiment was to investigate the thixotropic properties of silicas A and B of Table 1 with a commercial fumed silica at three levels of loading and three levels of additive. Silica A is Zeothix 265 and Silica B is Zeothix 95, both products being sold under that trademark by J. M. Huber Corporation. The fumed silica used was Cab-O-Sil, sold commercially under that trademark by Cabot Corporation.

Table 6A sets forth the data for preparation of the thixotropic silica-containing resin, the resin being the same as described for Example 1. The additive in all runs was Tween 20 ® and the amount added is based on the weight of the resin.

TABLE 6-A

| Run No. | Silica | phr Silica | % Additive |
|---|---|---|---|
| 1 | Zeothix-95 | 2.0 | 5 |
| 2 | " | 2.0 | 10 |
| 3 | " | 2.0 | 20 |
| 4 | Zeothix-95 | 3.0 | 5 |
| 5 | " | 3.0 | 10 |
| 6 | " | 3.0 | 20 |
| 7 | Zeothix-95 | 4.0 | 5 |
| 8 | " | 4.0 | 10 |
| 9 | " | 4.0 | 20 |
| 10 | Zeothix-265 | 2.0 | 5 |
| 11 | " | 2.0 | 10 |
| 12 | " | 2.0 | 20 |
| 13 | Zeothix-265 | 3.0 | 5 |
| 14 | " | 3.0 | 10 |
| 15 | " | 3.0 | 20 |
| 16 | Zeothix-265 | 4.0 | 5 |
| 17 | " | 4.0 | 10 |
| 18 | " | 4.0 | 20 |
| 19 | Cab-O-Sil | 0.5 | 5 |
| 20 | " | 0.5 | 10 |
| 21 | " | 0.5 | 20 |
| 22 | Cab-O-Sil | 1.0 | 5 |
| 23 | " | 1.0 | 10 |
| 24 | " | 1.0 | 20 |
| 25 | Cab-O-Sil | 1.5 | 5 |
| 26 | " | 1.5 | 10 |
| 27 | " | 1.5 | 20 |
| 28 | Control | | |

After preparation of the compositions, they were evaluated for viscosity using a Model LVT, Spindle #3, 6/60 RPM. The viscosity data is set forth below for periods from 1 day to 16 weeks.

TABLE 6-B

| Sample No. | 1-Day Visc. | Thix Index |
|---|---|---|
| 1 | 1090/516 | 2.0 |
| 2 | 9050/508 | 1.9 |
| 3 | 940/504 | 1.9 |
| 4 | 1940/726 | 2.7 |
| 5 | 1880/728 | 2.6 |
| 6 | 1760/716 | 2.5 |
| 7 | 3480/1080 | 3.2 |
| 8 | 3080/998 | 3.1 |
| 9 | 2900/974 | 3.0 |
| 10 | 1460/622 | 2.3 |
| 11 | 1420/614 | 2.3 |
| 12 | 1380/620 | 2.2 |
| 13 | 2850/928 | 3.1 |
| 14 | 2860/840 | 3.4 |
| 15 | 2780/958 | 2.9 |
| 16 | 4960/1336 | 3.7 |
| 17 | 4900/1348 | 3.6 |
| 18 | 4520/1306 | 3.5 |
| 19 | 1100/562 | 2.0 |
| 20 | 1120/592 | 1.9 |
| 21 | 1180/598 | 2.0 |
| 22 | 3360/1056 | 3.2 |
| 23 | 3860/1206 | 3.2 |
| 24 | 4380/1314 | 3.3 |
| 25 | 6580/1690 | 3.9 |
| 26 | 9900/2360 | 4.2 |
| 27 | 10,000/2410 | 4.1 |
| 28 | 180/230 | 0.8 |

TABLE 6-C

| Sample No. | 1-Week Visc. | Thix Index |
|---|---|---|
| 1 | 940/536 | 1.7 |
| 2 | 780/528 | 1.1 |
| 3 | 740/526 | 1.4 |
| 4 | 1500/718 | 2.1 |
| 5 | 1380/708 | 1.9 |
| 6 | 1340/714 | 1.9 |
| 7 | 2660/1016 | 2.6 |
| 8 | 2340/974 | 2.4 |
| 9 | 2260/968 | 2.3 |
| 10 | 1060/618 | 1.7 |
| 11 | 1120/634 | 1.8 |
| 12 | 1020/632 | 1.6 |
| 13 | 2200/924 | 2.4 |
| 14 | 2420/962 | 2.5 |
| 15 | 2240/958 | 2.3 |
| 16 | 3960/1302 | 3.0 |
| 17 | 4100/1328 | 3.1 |
| 18 | 3900/1294 | 3.0 |
| 19 | 940/620 | 1.5 |
| 20 | 900/622 | 1.4 |
| 21 | 920/648 | 1.4 |
| 22 | 2820/1038 | 2.7 |
| 23 | 3620/1232 | 2.9 |
| 24 | 4400/1368 | 3.2 |
| 25 | 6420/1716 | 3.7 |
| 26 | 7660/1950 | 3.9 |
| 27 | 9100/2460 | 3.7 |
| 28 | 360/242 | 1.5 |

TABLE 6-D

| Sample No. | 2-Week Visc. | Thix Index |
|---|---|---|
| 1 | 1040/516 | 2.0 |
| 2 | 600/528 | 1.1 |
| 3 | 660/538 | 1.2 |
| 4 | 1360/710 | 1.9 |
| 5 | 1100/706 | 1.6 |
| 6 | 1180/712 | 1.6 |
| 7 | 2220/994 | 2.2 |
| 8 | 2100/960 | 2.2 |
| 9 | 2020/964 | 2.1 |
| 10 | 740/628 | 1.2 |
| 11 | 780/642 | 1.2 |
| 12 | 840/638 | 1.3 |
| 13 | 1780/816 | 2.0 |
| 14 | 1920/916 | 2.1 |
| 15 | 1820/910 | 2.0 |
| 16 | 3440/1264 | 2.7 |
| 17 | 3700/1278 | 2.9 |
| 18 | 3200/1246 | 2.6 |
| 19 | 900/588 | 1.5 |

TABLE 6-D-continued

| Sample No. | 2-Week Visc. | Thix Index |
|---|---|---|
| 20 | 740/634 | 1.2 |
| 21 | 800/618 | 1.3 |
| 22 | 2320/990 | 2.3 |
| 23 | 2880/1144 | 2.5 |
| 24 | 3080/1150 | 2.7 |
| 25 | 5640/1652 | 3.4 |
| 26 | 6580/1868 | 3.5 |
| 27 | 6900/2420 | 2.8 |
| 28 | 420/242 | 1.7 |

TABLE 6-E

| Sample No. | 4-Week Visc. | Thix Index |
|---|---|---|
| 1 | 780/526 | 1.5 |
| 2 | 820/548 | 1.5 |
| 3 | 620/540 | 1.1 |
| 4 | 1200/700 | 1.7 |
| 5 | 1000/694 | 1.4 |
| 6 | 920/708 | 1.3 |
| 7 | 1900/976 | 1.9 |
| 8 | 1830/954 | 2.0 |
| 9 | 1900/950 | 2.0 |
| 10 | 880/628 | 1.4 |
| 11 | 880/638 | 1.4 |
| 12 | 800/644 | 1.2 |
| 13 | 1680/854 | 2.0 |
| 14 | 1760/894 | 2.0 |
| 15 | 1600/900 | 1.8 |
| 16 | 3260/1202 | 2.7 |
| 17 | 3340/1216 | 2.6 |
| 18 | 3060/1220 | 2.5 |
| 19 | 820/604 | 1.4 |
| 20 | 1020/608 | 1.7 |
| 21 | 720/636 | 1.1 |
| 22 | 2380/1000 | 2.4 |
| 23 | 2940/1152 | 2.6 |
| 24 | 2900/1162 | 2.5 |
| 25 | 5500/1644 | 3.3 |
| 26 | 6400/1858 | 3.4 |
| 27 | 7100/2320 | 3.4 |
| 28 | 460/250 | 1.8 |

TABLE 6-F

| Sample No. | 8-Week Visc. | Thix Index |
|---|---|---|
| 1 | 680/544 | 1.2 |
| 2 | 620/594 | 1.1 |
| 3 | 820/532 | 1.5 |
| 4 | 1300/700 | 1.8 |
| 5 | 1020/696 | 1.5 |
| 6 | 1260/718 | 1.8 |
| 7 | 1180/952 | 1.2 |
| 8 | 2000/932 | 2.1 |
| 9 | 1790/924 | 1.9 |
| 10 | 840/590 | 1.4 |
| 11 | 800/632 | 1.3 |
| 12 | 1000/632 | 1.6 |
| 13 | 1700/844 | 2.0 |
| 14 | 2000/868 | 2.3 |
| 15 | 1920/890 | 2.2 |
| 16 | 3300/1188 | 2.8 |
| 17 | 3240/1224 | 2.6 |
| 18 | 3180/1192 | 2.7 |
| 19 | 940/604 | 1.6 |
| 20 | 1000/618 | 1.6 |
| 21 | 1080/630 | 1.7 |
| 22 | 2540/990 | 2.6 |
| 23 | 2980/1190 | 2.5 |
| 24 | 3020/1178 | 2.6 |
| 25 | 5520/1630 | 3.4 |
| 26 | 6300/1820 | 3.5 |
| 27 | 6500/2250 | 2.9 |
| 28 | 400/248 | 1.6 |

TABLE 6-G

| Sample No. | 16-Week Visc. | Thix Index |
|---|---|---|
| 1 | 720/528 | 1.4 |
| 2 | 820/516 | 1.6 |
| 3 | 760/528 | 1.4 |
| 4 | 1280/670 | 1.9 |
| 5 | 1260/676 | 1.9 |
| 6 | 1300/692 | 1.9 |
| 7 | 1140/944 | 1.2 |
| 8 | 2000/910 | 2.2 |
| 9 | 2080/928 | 2.2 |
| 10 | 900/574 | 1.6 |
| 11 | 1000/618 | 1.6 |
| 12 | 1040/608 | 1.7 |
| 13 | 1720/822 | 2.1 |
| 14 | 1840/846 | 2.2 |
| 15 | 2000/870 | 2.3 |
| 16 | 3040/713 | 2.7 |
| 17 | 3120/1200 | 2.6 |
| 18 | 3360/1204 | 2.8 |
| 19 | 1320/590 | 2.2 |
| 20 | 1100/588 | 1.9 |
| 21 | 1160/612 | 1.9 |
| 22 | 2600/996 | 2.6 |
| 23 | 3080/1180 | 2.6 |
| 24 | 3120/1170 | 2.7 |
| 25 | 5440/1628 | 3.3 |
| 26 | 6300/1816 | 3.5 |
| 27 | 6500/2230 | 2.9 |
| 28 | 440/270 | 1.6 |

This study shows that one needs to use 2 to 3 phr of precipitated silica A to obtain a thixotropic index above 2. At 2.5 phr use level, the precipitated silica A is better than fumed silica in cost-performance properties.

EXAMPLE 5

A controlled structure precipitated silica was evaluated in the gel coat formulation. Formulations containing precipitated silica are much better in rheology, anti-sag properties, viscosity stability and spray characteristics.

The gel coat formulation which was used in this study is given below:

TABLE 7

| GEL COAT COMPOSITIONS | | |
|---|---|---|
| | A | B |
| Isophthalic Resin | 53.50 | 53.50 |
| Fumed Silica | 2.00 | — |
| Precipitated Silica | — | 4.00 |
| Ethylene Glycol | 0.02 | 0.10 |
| TiO$_2$ | 9.50 | 9.50 |
| Styrene Monomer | 23.58 | 23.50 |
| Talc | 11.10 | 9.10 |
| Cobalt 6% Octoate | 0.30 | 0.30 |
| TOTAL | 100.00 | 100.00 |

Formulation A contained fumed silica and formulation B contained precipitated silica. The rheology and viscosity stabilities of the gel coats were evaluated by using Brookfield viscometer RVT, spindle #6 at 5 and 50 rpm. The thixotropic index was calculated by dividing the viscosity values at 5/50 rpm.

The following rheology data was obtained.

| | Age (Days) | BROKFIELD VISCOSITY | | | |
|---|---|---|---|---|---|
| | | 5 rpm | 50 rpm | T.I. | Sag-Rating |
| Gel Coat "A" | 1 | 27,000 | 3,560 | 7.58 | Standard |
| | 7 | 26,400 | 3,560 | 7.41 | Standard |
| Gel Coat | 1 | 30,500 | 3,860 | 7.90 | Better |

-continued

| | BROOKFIELD VISCOSITY | | | | |
|---|---|---|---|---|---|
| | Age (Days) | 5 rpm | 50 rpm | T.I. | Sag-Rating |
| "B" | 7 | 28.200 | 3,660 | 7.10 | Better |

The rheology characteristics, spray properties and anti-sag properties of gel coat "B", containing precipitated silica, are much better than the gel coat containing fumed silica.

The invention has been described herein with reference to certain preferred embodiments. However, as obvious variations thereon will become apparent to those skilled in the art, the invention is not considered to be limited thereto.

I claim:

1. A thixotropic unsaturated polyester resin, said unsaturated polyester resin being thixotropic by reason of having dispersed therein a thixotropic agent selected from the group consisting of a precipitated silicon dioxide and a mixture of a precipitated silicon dioxide and fumed silica, being the sole thrixotropic agent contained in said polyester resin.

2. A polyester composition according to claim 1 wherein the thixotropic agent is a precipitated silicon dioxide.

3. A polyester composition according to claim 1 wherein the thixotropic agent is a mixture of a precipitated silicon dioxide and fumed silica.

4. A polyester composition according to claim 1 wherein the precipitated silicon dioxide is characterized as having a surface area in the range of about 60-300 $m^2g$, a bulk density of about 64-96 g/l, a 5% pH in the range of about 6.5 to 7.5, as containing 8-10 silanol groups per $nm^2$; an oil absorption from about 175 to 200 ml/100 g, with an average aggregate or secondary particle size ranging from about 1-10 microns.

5. A polyester composition according to claim 1 wherein the fumed silica has a surface area in the range of 200-400 $m^2g$; a non-porous external surface; and a bulk density in the range of 32-64 g/l, a 5% pH value of 3.0-4.2, with 2-4 silanol groups per $nm^2$.

6. A polyester composition according to claim 1 wherein the resins comprise polyesters based on unsaturated acids or acid anhydrides and diols, in admixture with unsaturated aromatic monomers.

7. A polyester composition according to claim 1 wherein the amount of precipitated silicon dioxide incorporated into the resin ranges from about 1 to 5 parts per hundred parts of resin.

8. A polyester composition according to claim 1 wherein 2 to 4 parts of precipitated silicon dioxide are incorporated into the resin per 100 parts of resin.

9. A polyester composition according to claim 1 wherein the precipitated silicon dioxide is admixed with fumed silica, wherein the fumed silica is present in the range of up to 60 wt%.

10. A polyester composition according to claim 9 wherein the blends are incorporated into the resin in the range of 0.5 to 5 phr.

11. A polyester composition according to claim 1 wherein the polyesters are formed from a dicarboxylic acid and a diol having a major amount of olefinic unsaturation, the olefinic unsaturation being derived from the carboxylic acid and having molecular weights of from about 400 to 10,000 and acid numbers in the range of from 35 to 45 mg KOH per gram of resin.

12. A fiberglass reinforced structure containing a thixotropic polyester resin composition according to claims 1, 2, or 3.

13. A gel coat comprising a thixotropic polyester resin composition according to claims 1, 2, or 3.

14. A boat structure comprising the fiberglass reinforced structure of claim 12.

15. A boat structure containing an exterior surface comprising gel coat of claim 13.

16. A method for providing thixotropic properties to an unsaturated polyester resin, said method comprising dispersing therein a thixotropic-effective amount of a member selected from the group consisting of a precipitated silicon dioxide and a mixture of a precipitated silicon dioxide and fumed silica, said silicon dioxide or mixture of silicon dioxide and fumed silica being the sole thixotropic member contained in said polyester resin.

* * * * *